Patented Nov. 7, 1933

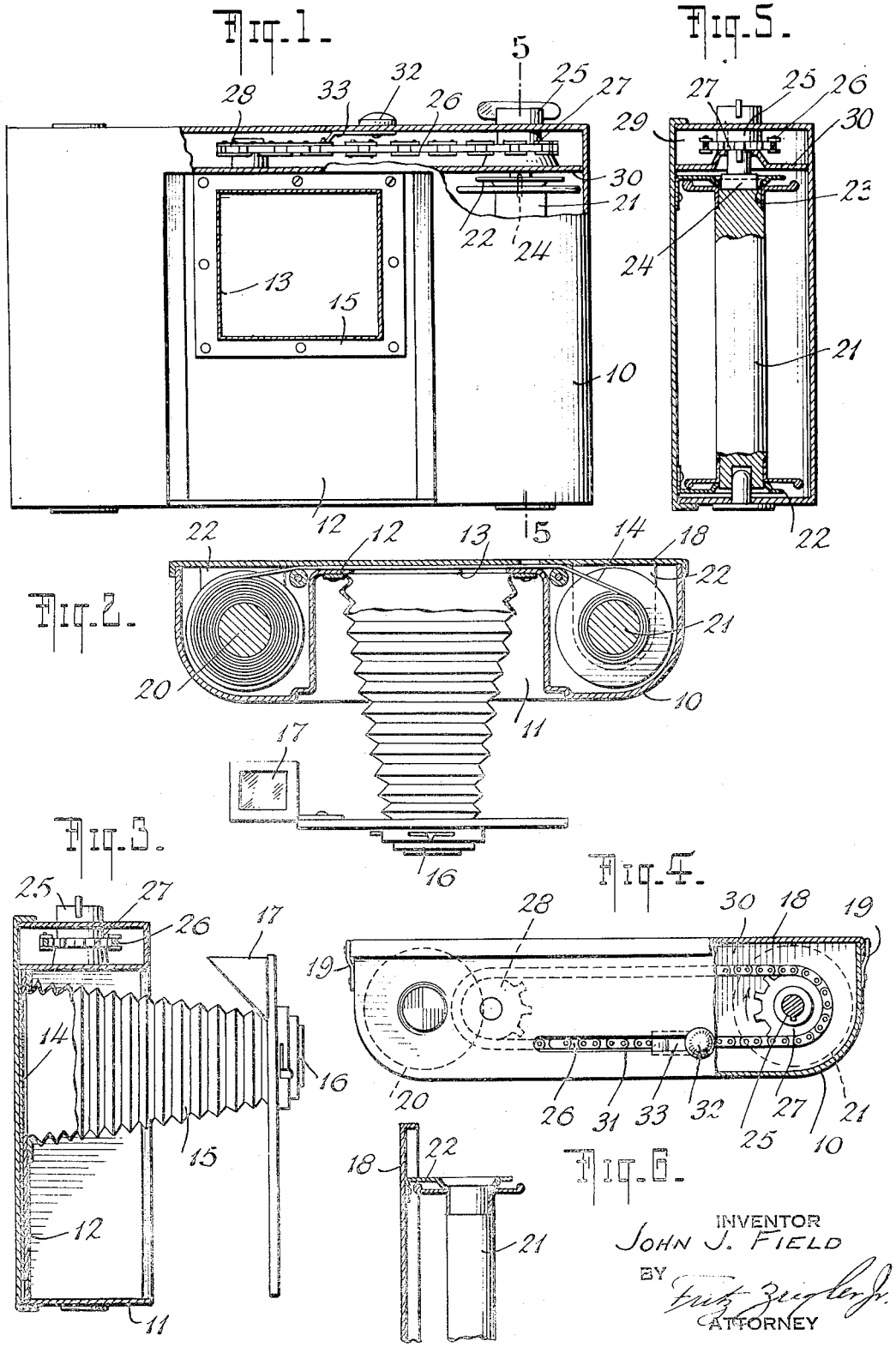

1,934,178

UNITED STATES PATENT OFFICE 1,934,178

CAMERA

John J. Field, New Dorp, Staten Island, N. Y.

Application July 19, 1932. Serial No. 623,336

4 Claims. (Cl. 95—32)

This invention relates to improvements in cameras and has particular reference to the type of camera in which rolls of sensitized sheets or films are employed in making exposures.

An object of the invention is to provide an improved camera of simple and practical construction by means of which the number of exposures obtainable on the usual type of a film of a given length can be materially increased.

Another object is to support the film and its rolls within the camera casing in such manner that after one longitudinal section of the film has been exposed for the purpose of producing a series of pictures thereon, the position of the film and its rolls may be reversed and the other longitudinal section of the film then exposed.

A further object is to provide a simple and effective means for moving the film from the feed to the take-up rolls for each successive exposure to be made.

A still further object is to support the sensitized sheet or film in a mounting plate which is removably connected to the casing of the camera.

The above and other objects will appear more clearly from the following detailed description, when taken in connection with the accompanying drawing, which illustrates a preferred embodiment of the inventive idea.

In the drawing—

Figure 1 is a fragmentary front elevation, partly in section, of the camera constructed in accordance with the invention.

Figure 2 is a horizontal section there-through.

Figure 3 is a vertical longitudinal section.

Figure 4 is a top plan view partly broken away and shown in section.

Figure 5 is a section taken substantially on the line 5—5 of Figure 1; and

Figure 6 is a fragmentary detailed view showing the manner of supporting one of the film rolls on the detachable mounting plate of the camera.

Referring more particularly to the accompanying drawing, the numeral 10 indicates generally the casing of the camera, which is provided in the front thereof with the recess 11, the bottom of which constitutes the rear wall 12 of the casing. Said wall is provided with an exposure opening 13 which is of less area than the wall itself and the height of which is less than the width of the sensitized sheet or film 14, so that as said film is moved past the exposure opening, in a manner to later appear, only the then upper longitudinal portion of the film will be exposed. Secured to the rear wall 12 of the casing, and surrounding the opening 13 therein, are the usual bellows 15, supporting at the outer end thereof the customary lens 16 and range finder 17.

Detachably mounted upon the casing at the rear thereof is a mounting plate 18 removably held in position on the camera by suitable means, such as spring clips 19, carried by the casing. This mounting plate is designed to support the feed and take-up rolls 20 and 21, respectively, upon which the film 14 is adapted to be wound. To support said rolls on the plate 18, the latter is provided with two pairs of extensions or lugs 22 on opposite ends thereof and between each pair of said lugs one of said rolls is adapted to be engaged. By thus mounting the rolls on the plate 18, it will be obvious that there is provided an assembly which permits of the film being removed from the casing along with said plate, as distinguished from the customary camera in which the film is mounted directly in the casing independently of the removable back plate. The present construction is provided for the purpose of enabling the mounting plate and film with its rolls to be detached from the casing 10 after one longitudinal portion of said film has been exposed, and then to replace said mounting plate and film on the camera casing in a reverse position so that the other longitudinal portion, which was initially the bottom portion of the film, will now be in position to be exposed as the same is moved past the opening 13. When thus reversed, the roll 21, which was originally the take-up roll, now becomes the feed-roll from which the film is fed on to the roll 20 which is now the take-up roll.

Both of the rolls are each provided in one end thereof with a key slot 23, which, when the roll assumes the take-up position, is adapted to receive the key 24 of the usual winding stem 25.

Instead of utilizing the stem 25 to wind the film upon the take-up roll, other means may be employed for successively moving portions of the sensitized film into position for exposure through the opening 13. This other means, as shown, comprises an endless element 26 in the form of a chain which extends around a sprocket 27 carried by the stem 25 and also around a second idler sprocket 28, said sprockets and chain being disposed within a chamber 29 formed in the upper portion of the casing 10 by means of the partition 30.

In the top of the casing 10 there is provided an elongated slot 31 in which is movable a hand grip or knob 32 which carries a spring pawl 33 engageable with the links of the chain 26 to move the same in one direction so as to operate the take-up roll to wind the film 14 thereon. The length of the slot 31 is such that when the knob 32 is moved from one end thereof, as shown in Figure 4, to the other end of the slot, the chain 26 will be advanced by the pawl 33 sufficiently to move an exposed portion of the film 14 out of alignment with the opening 13 and bring a succeeding unexposed portion of said film in position for an exposure. After thus moving the film, the knob 32 is restored to its original position during which movement the pawl 33 idles over the links of the chain.

What is claimed is:

1. In a camera, a casing, means carried thereby for exposing a sensitized sheet, a mounting plate detachably connected to said casing, feed and take-up rolls carried by said mounting plate for supporting a sensitized sheet, an endless drive element connected to said feed roll, and means to move said element a predetermined distance to successively feed portions of said sheet from said feed roll onto said take-up roll.

2. In a camera, a casing having an elongated slot, means including feed and take-up rolls to support a sensitized sheet within said camera, a sprocket on said feed roll, a second sprocket mounted in said casing, an endless element engaging said sprockets, and means extending through and slidable along said slot and engageable with said endless element to move said sheet from the feed roll to said take-up roll for successive exposures.

3. In a camera, a casing having a recess the rear wall of which is provided with an exposure opening of less area than the width of a film which is movable past said opening, a bellows attached to said rear wall and encircling said opening, a lens carried by said bellows, a mounting plate detachably connected to said casing and adjustable to a reversed position relative thereof, feed and take-up rolls carried by said mounting plate, and capable of receiving a film thereon for movement past said opening with one longitudinal portion exposed therethrough, and means to move said film from one of said rolls to the other in either position of adjustment of said mounting plate.

4. In a camera, a casing having a recess in the front top and a slot in its top, the rear wall of said recess having an exposure opening of less height than the width of a film movable past said opening, a mounting plate removably connected to the casing and attachable thereto in different positions, film feed and take-up rolls carried by said mounting plate so as to present different longitudinal portions of said film to said exposure opening in the different positions of said mounting plate, driving means connected to one of said rolls, and means projecting through said slot to operate said driving means.

JOHN J. FIELD.